(12) United States Patent
Bahirat et al.

(10) Patent No.: US 10,838,805 B2
(45) Date of Patent: Nov. 17, 2020

(54) GENERATING PARITY DATA BASED ON A CHARACTERISTIC OF A STREAM OF DATA

(71) Applicant: Micron Technology, Inc., Boise, ID (US)

(72) Inventors: Shirish Bahirat, Longmont, CO (US); Aditi P. Kulkarni, Boulder, CO (US)

(73) Assignee: MICRON TECHNOLOGY, INC., Boise, ID (US)

( * ) Notice: Subject to any disclaimer, the term of this patent is extended or adjusted under 35 U.S.C. 154(b) by 289 days.

(21) Appl. No.: 15/903,997

(22) Filed: Feb. 23, 2018

(65) Prior Publication Data

US 2019/0266046 A1  Aug. 29, 2019

(51) Int. Cl.
H04M 13/00 (2006.01)
G06F 11/10 (2006.01)
G06F 3/06 (2006.01)

(52) U.S. Cl.
CPC ............ *G06F 11/10* (2013.01); *G06F 3/0619* (2013.01); *G06F 3/0656* (2013.01); *G06F 3/0683* (2013.01); *G06F 11/108* (2013.01)

(58) Field of Classification Search
CPC .... G06F 11/10; G06F 11/108; G06F 11/1032; G06F 11/1068; G06F 3/0619; G06F 3/0656; G06F 3/0659; G06F 3/0683; G06F 2003/0691
See application file for complete search history.

(56) References Cited

U.S. PATENT DOCUMENTS

| | | | | |
|---|---|---|---|---|
| 2002/0087797 | A1* | 7/2002 | Adrangi | G06F 12/0888 711/133 |
| 2003/0046497 | A1* | 3/2003 | Dandrea | G06F 11/1076 711/154 |
| 2013/0081063 | A1* | 3/2013 | Hosie | G06F 9/546 719/314 |
| 2013/0326317 | A1* | 12/2013 | Adler | G06F 11/10 714/800 |

(Continued)

FOREIGN PATENT DOCUMENTS

WO    2006138249    12/2006

OTHER PUBLICATIONS

International Search Report and Written Opinion for Application No. PCT/US2019/019232 dated May 28, 2019, 13 pages.

*Primary Examiner* — Albert Decady
*Assistant Examiner* — Enamul M Kabir
(74) *Attorney, Agent, or Firm* — Lowenstein Sandler LLP (57) ABSTRACT

A buffer memory storing first parity data for a first stream of data associated with data that is stored at a storage system may be identified. A request to store second parity data for a second stream of data associated with data that is to be stored at the storage system may be received and a characteristic of the first stream of data may be identified. A determination may be made as to whether to replace the first parity data for the first stream with the second parity data for the second stream based on the characteristic of the first stream of data. In response to determining to replace the first parity data with the second parity data based on the characteristic, the second parity data for the second stream of data may be generated and stored at the buffer memory to replace the first parity data.

35 Claims, 7 Drawing Sheets

(56) References Cited

U.S. PATENT DOCUMENTS

2014/0237287 A1* 8/2014 Burd .................. G06F 11/1028
714/6.24
2016/0246519 A1* 8/2016 McKean ............... G06F 3/0611
2017/0102993 A1* 4/2017 Hu ..................... G06F 11/1068

* cited by examiner

GENERATING PARITY DATA BASED ON A CHARACTERISTIC OF A STREAM OF DATA

TECHNICAL FIELD

The present disclosure generally relates to a storage system, and more specifically, relates to generating parity data based on a characteristic of a stream of data.

BACKGROUND

A storage system can include one or more memory components that store data. For example, a solid-state drive (SSD) can include memory devices such as non-volatile memory devices. The SSD can further include a controller that can manage each of the memory devices and allocate data to be stored at the memory devices. A host system can utilize the SSD and request data from the SSD. The controller can be used to retrieve data from the corresponding memory devices and return the retrieved data to the host system.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to generating parity data based on a characteristic of a stream of data. In general, a host system may utilize a storage system to store data. The host system may provide write requests to store data at the storage system. A group of the write requests may be referred to as a stream of data where the write requests of a particular stream share at least one characteristic. For example, a stream of data may be a group of write requests from a particular application that is executed by the host system.

An example of the storage system is a solid-state drive (SSD) that includes memory devices (e.g., non-volatile memory) and a controller to manage the memory devices. The controller may manage the storing of data from multiple streams of data and may implement a redundancy operation as the data from a particular stream is written to the memory devices of the storage system. The redundancy operation may be performed when storing data from each of the different streams of data. For example, a redundant array of independent NAND (RAIN) operation may be implemented by the storage controller to provide redundancy for the data stored for each of the different streams. The redundancy operation may protect the data against a failure of a portion of a memory device that is storing data from the respective stream. For example, parity data may be generated for a particular stream when writing data from the particular stream to the storage system. The parity data may be generated based on an exclusive-or (XOR) operation with the received data from the particular stream and may be used to reconstruct or recalculate the data from the stream in the event of a failure of the portion of the memory device that is storing data from the stream. As an example, the parity data may be calculated for a particular number of user data blocks from a stream of data and the parity data may be stored with the user data blocks at different portions or locations of memory devices. If a portion of a memory device that includes one of the user data blocks fails and the corresponding data is lost, then the lost data may be recalculated or reconstructed based on an XOR operation between the other user data blocks and the parity data.

As previously described, the storage system may be used to store data from multiple distinct streams of data. The controller of the storage system may include an XOR calculator to perform the XOR operation that is used to calculate a different parity data for each of the streams when data from the streams is written to the storage system. The controller may include a fewer number of XOR calculators than streams of data that may be managed by the controller. As a result, the use of the XOR calculator may be shared by multiple streams of data. The XOR calculator may include a buffer memory that is used to store parity data for each of the streams that are currently providing data to be written to the storage system. However, the buffer memory of the XOR calculator may be limited in capacity and thus not be able to store parity data for every stream of data that is managed by the controller. Thus, at a particular time, the XOR calculator and its buffer memory may be used to calculate parity data for each stream of a first number of streams (e.g., active streams) while not being used to calculate parity data for a second number of streams (e.g., non-active streams). However, if one of the streams from the second number of streams corresponding to non-active streams is to store data at the storage system, then the parity data of this stream may be calculated by the XOR calculator as the data from the stream is stored at the storage system. In response to the parity data of a new stream being generated, the parity data of another stream of data from the first number that corresponds to the active streams that is currently stored at the buffer memory may be removed and the parity data for the new stream may be calculated by using the buffer memory that was previously storing the parity data of the now removed stream. The switching of the parity data of the streams from the buffer memory of the XOR calculator may utilize a certain amount of time before the XOR calculator is prepared to calculate the parity data for the new stream. As a result, the performance of the storage system may be decreased when the number of parity data of streams being switched at the buffer memory of the XOR calculator is increased as the time to store the data from the new stream may be delayed until the switching of the parity data at the memory buffer is completed. Thus, a controller of a storage system may manage multiple streams of data where a first portion of the streams of data are active streams where parity data for each of the active streams is currently stored at the buffer memory and a second portion of the streams of data are non-active streams where parity data for each of the non-active streams is not currently stored at the buffer memory. The parity data for one of the active streams may be switched to store another parity data for a currently non-active stream when data from the non-active stream is to be written to the storage system at a later time.

Aspects of the present disclosure address the above and other deficiencies by assigning the streams of data to a buffer memory that is used to store parity data generated by the XOR calculator. The assigning of the steams of data may be based on one or more characteristics or a context of each of the streams. Such characteristics may be based on a frequency of data from a respective stream being received, a type of write operation (e.g., a number of programming passes) being performed by a respective stream, data availability for a respective stream, and a memory device scheduling associated with the streams of data. For example, the XOR calculator may be generating a parity data for a first stream as data from the first stream is stored at the storage system. A second stream that is not currently assigned to the memory buffer may provide new data that is to be stored at the storage system. The characteristics of the first stream may be used to determine whether the XOR calculator should continue to generate the parity data for the first stream or to replace the parity data of the first stream with parity data for the second stream. If a determination is made that the XOR calculator should halt the generating of the parity data for the first stream, then the buffer memory of the XOR calculator may replace the parity data for the first stream to store other parity data for the second stream. Otherwise, if the determination is made that the XOR calculator should not halt the generating of the parity data for the first stream, then another buffer memory of the XOR calculator may replace another parity data for a third stream with the parity data that will be generated for the second stream. Such determinations based on the characteristics of the streams may not halt the generating of parity data for a particular stream that is more likely to store data at the storage system or is more likely to increase the utilization of the storage system.

Advantages of the present disclosure include, but are not limited to, the increased performance of the storage system as the buffer memory of the XOR calculator may store parity data for streams so that there is less switching of streams at the buffer memory that stores parity data for the streams. As a result, the write performance of the storage system may be increased while the redundancy operation using the parity data is also provided. For example, write operations from each of the streams may store data at the memory devices more quickly as the parity data for more active or used streams of data at the buffer memory may not be replaced with parity data for less active or used streams of data.

Figure 1:
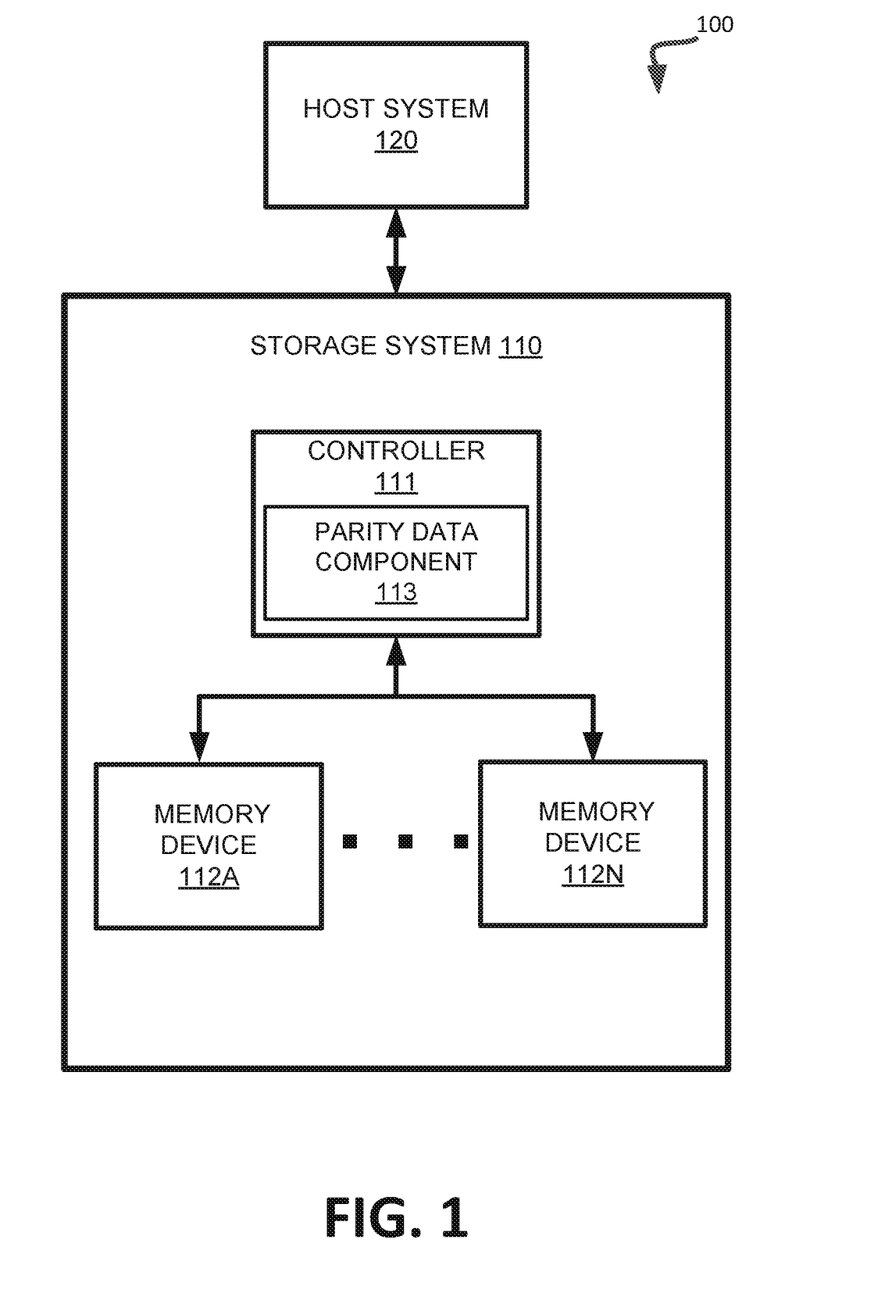
FIG. 1 illustrates an example computing environment that includes a storage system in accordance with some embodiments of the present disclosure.

FIG. 1 illustrates an example computing environment 100 that includes a storage system 110, in accordance with some embodiments of the present disclosure. An example of a storage system 110 is a solid-state drive (SSD). In general, the computing environment 100 can include a host system 120 that uses the storage system 110. For example, the host system 120 can write data to the storage system 110 and read data from the storage system 110.

The host system 120 can be a computing device such as a desktop computer, laptop computer, network server, mobile device, or such computing device that includes a memory and a processing device. The host system 120 can include or be coupled to the storage system 110 so that the host system 120 can read data from or write data to the storage system 110. The host system 120 can be coupled to the storage system 110 via a physical host interface. As used herein, "coupled to" generally refers to a connection between components, which may be an indirect communicative connection or direct communicative connection (e.g., without intervening components), whether wired or wireless, including connections such as, electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the storage system 110. The host system 120 can further utilize an NVM Express (NVMe) interface to access the memory devices 112A to 112N when the storage system 110 is coupled with the host system 120 by the PCIe interface. The interface can provide an interface for passing control, address, data, and other signals between the storage system 110 and the host system 120.

As shown in FIG. 1, the storage system 110 can include a controller 111 and memory devices 112A to 112N. In some embodiments, the memory devices 112A to 112N are based on non-volatile memory. For example, the memory devices 112A to 112N may be a negative- and (NAND) type flash memory. Each of the memory devices 112A to 112N can include one or more arrays of memory cells such as single level cells (SLCs) or multi-level cells (MLCs) (e.g., triple level cells (TLCs) or quad-level cells (QLCs)). In some embodiments, a particular memory device includes both SLC memory cells and MLC memory cells. Each of the memory cells can store one or more bits of data (e.g., data blocks) used by the host system 120. Although non-volatile memory devices such as NAND type flash memory are described, the memory devices 112A to 112N can be based on any other type of non-volatile memory or volatile memory. For example, the memory devices 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. The memory devices 112A to 112N can include any combination of the different types of non-volatile memory or volatile memory. Furthermore, the memory cells of the memory devices 112A to 112N can be grouped as memory pages or data blocks that may refer to a unit of the memory device used to store data.

The controller 111 can communicate with the memory devices 112A to 112N to perform operations such as reading data, writing data, or erasing data at the memory devices 112A to 112N and other such operations. Furthermore, the controller 111 can include hardware such as one or more integrated circuits and/or discrete components, a processing device, a buffer memory, software such as firmware or other instructions, or a combination thereof. In general, the controller 111 can receive commands or operations from the host system 120 and can convert the commands or operations into instructions or appropriate commands to achieve the desired access to the memory devices 112A to 112N. The controller 111 can be responsible for other operations such as wear leveling operations, garbage collection operations, error detection and error-correcting code (ECC) operations, encryption operations, caching operations, and address translations between a logical block address and a physical block address that are associated with the memory devices 112A to 112N. The controller 111 can further include host interface circuitry to communicate with the host system 120 via the physical host interface. The host interface circuitry can convert the commands received from the host system into command instructions to access the memory devices 112A to 112N as well as convert responses associated with the memory devices 112A to 112N into information for the host system 120.

The storage system 110 includes a parity data component 113 that can be used to identify streams of data from the host system 120 and can assign the streams of data to one or more buffer memories of an XOR calculator. For example, the parity data component 113 can identify characteristics of streams of data received from the host system 120 that are to be stored at the memory device 112A to 112N. As the data from the various streams are received to be stored at the storage system, the parity data component 113 can identify particular streams for which parity data may be generated and stored at the buffer memories. Further details with regards to the operations of the parity data component 113 are described below.

The storage system 110 can include additional circuitry or components that are not illustrated. For example, the storage system 110 can include a cache or buffer (e.g., DRAM) and address circuitry (e.g., a row decoder and a column decoder) that may receive an address from the controller 111 and decode the address to access the memory devices 112A to 112N.

Figure 2:
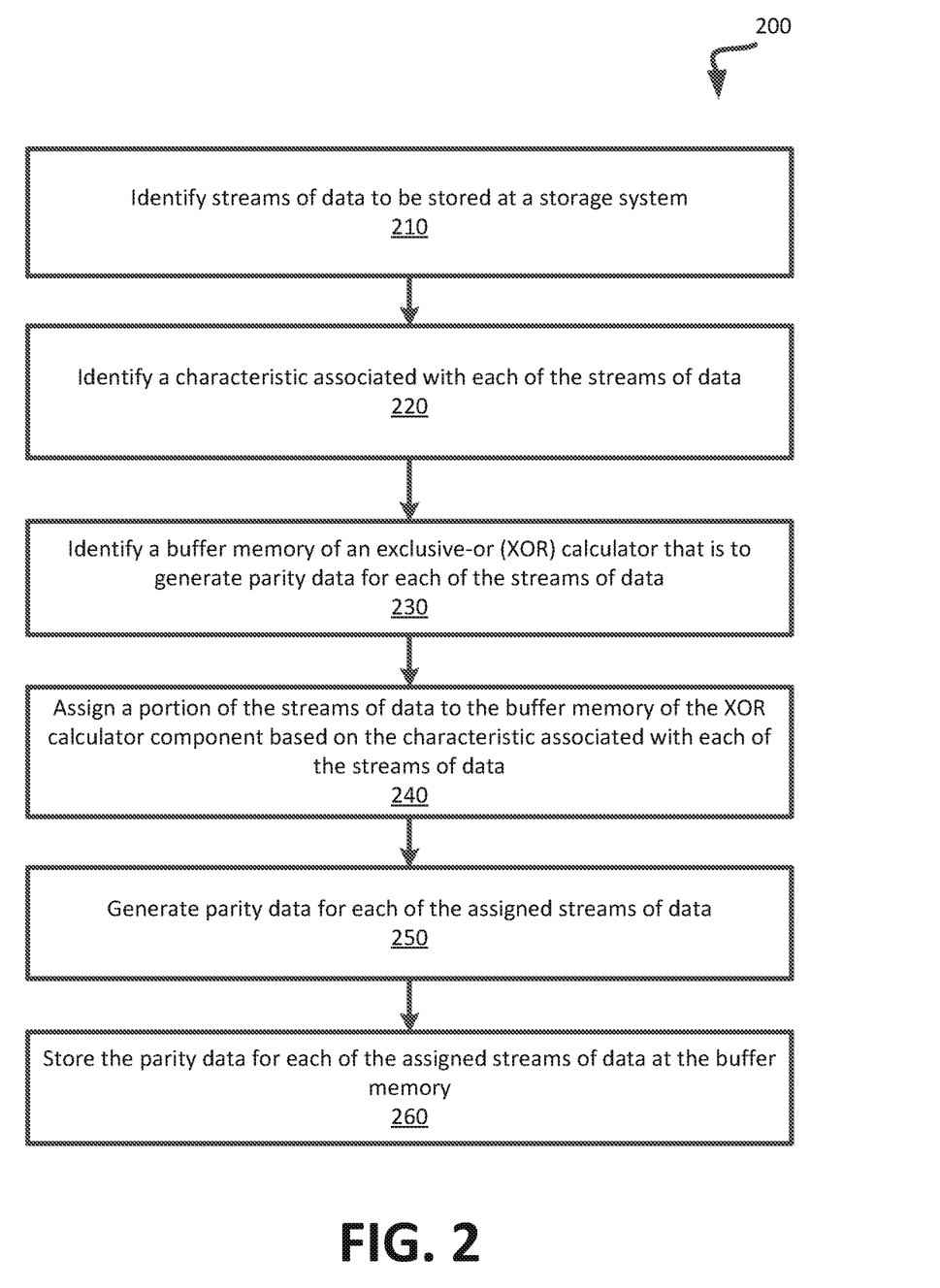
FIG. 2 is a flow diagram of an example method to assign streams of data to a buffer memory for storing parity data in accordance with some embodiments of the present disclosure.

FIG. 2 is a flow diagram of an example method 200 to assign streams of data to a buffer memory for storing parity data. The method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the parity data component 113 of the controller 111 of FIG. 1.

As shown in FIG. 2, the method 200 may begin, at block 210, with processing logic identifying streams of data to be stored at a storage system. For example, multiple streams of data may be identified where each of the streams of data includes data from write requests that are to be stored at the storage system. A stream of data may refer to data from multiple write requests that share at least one attribute or categorization. For example, a stream of data may refer to data from write requests that have been issued from the same application, write requests of a similar type (e.g., data of a same file type), data from write requests that have been issued from a particular process (e.g., a type of operating system command), etc. The data from a particular stream may be associated with the same lifetime (e.g., the data from a stream is expected to be erased at the same or approximately same time or is expected to be erased within a same amount or period of time after being written). Thus, a stream of data may refer to a group or collection of write requests specifying data to be stored at the storage system. Each of the streams of data may be separately identified. The processing logic may further identify a characteristic associated with each of the streams of data (block 220). For example, one or more characteristics may be identified for each of the streams of data. The characteristics may include, but are not limited to, a frequency of data from a particular stream being received, a type of write operation being performed by the particular stream, data availability for the particular stream, and a memory device scheduling associated with the streams of data at the storage system. Further details with regards to the characteristics associated with the streams of data are described in conjunction with FIG. 5.

The processing logic may further identify a buffer memory of an XOR calculator that is to generate parity data for each of the streams of data (block 230). For example, the XOR calculator may generate a different parity data for each stream of data as data from a corresponding stream is stored at the storage system. In some embodiments, the parity data may be based on a number of previously received data blocks from a respective stream. The parity data may be used to reconstruct or recalculate the data from a respective stream in the event of a failure of a memory device. Further details with regards to generating the parity data and reconstructing lost data are described in conjunction with FIG. 3. The processing logic may further assign a portion of the streams of data to the buffer memory of the XOR calculator based on the characteristic associated with each of the streams of data (block 240). For example, a subset (e.g., a proper subset) of the streams of data may be assigned to the buffer memory while a second subset or number of the streams of data may not be assigned to the buffer memory at a particular time. The assigning of a stream of data to the buffer memory may result in one or more locations or blocks of the buffer memory being used to store parity data for the respective assigned stream of data as the XOR calculator generates the parity data when data from the respective assigned stream is received to be stored at the storage system.

Referring to FIG. 2, the processing logic may further generate parity data for each of the assigned streams of data (block 250). For example, the XOR calculator may perform an XOR operation between received data from a respective stream and a previous parity data that has been calculated for the respective stream. For example, for each assigned stream, a parity data may be generated for each stripe of the assigned stream. A stripe may refer to a group of data blocks or user data elements from the stream that are associated with a single parity data. The processing logic may further store the parity data for each of the assigned streams of data at the buffer memory (block 260).

As such, a controller of a storage system may manage multiple streams of data. One or more characteristics for each of the streams of data may be identified. A first portion of the streams may be assigned to a buffer memory for storing a generated parity data value for each respective stream based on the one or more characteristics. A second portion of the streams may not be assigned to the buffer memory for storing respective parity data values based on the one or more characteristics until a later time.

Figure 3:
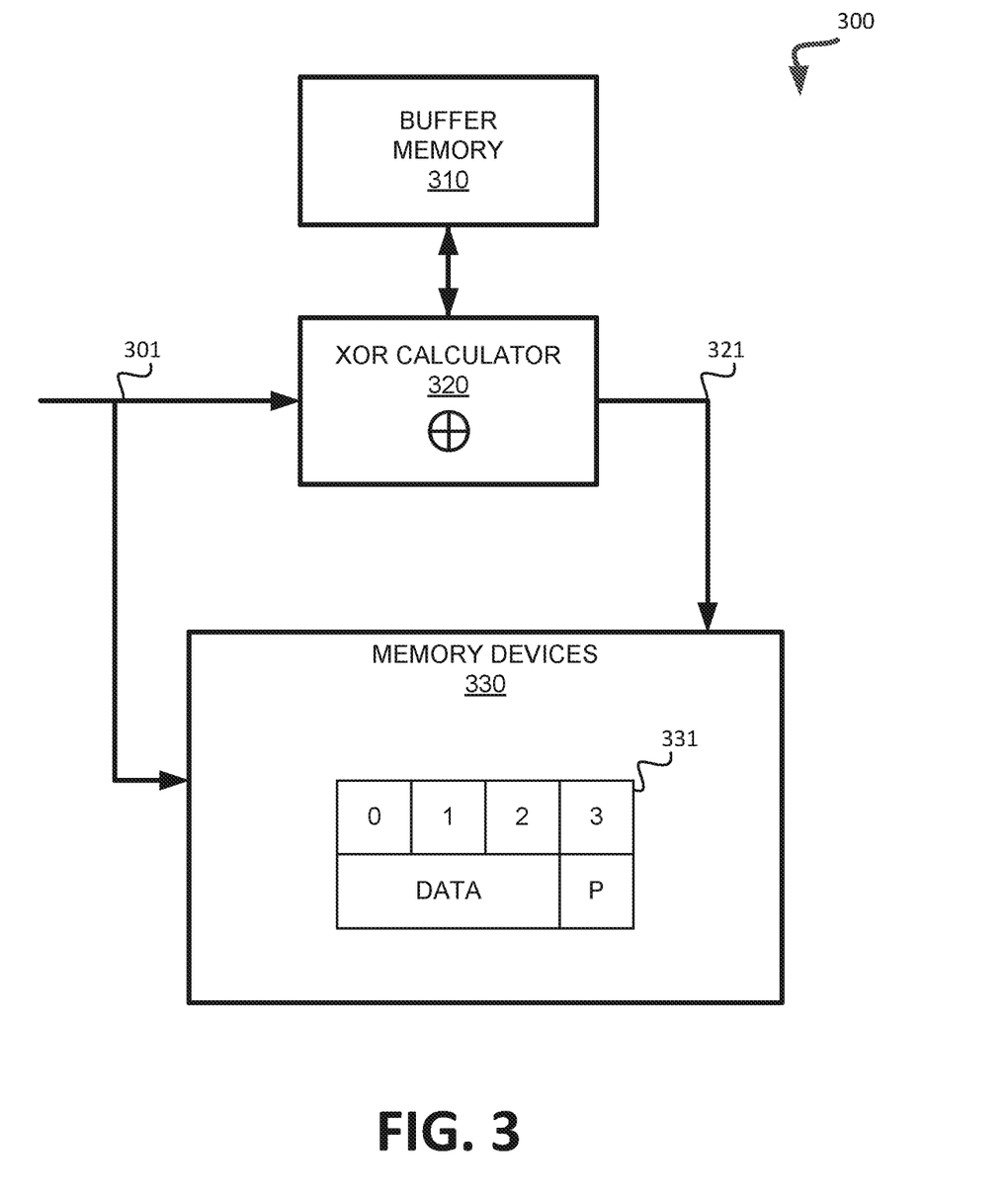
FIG. 3 illustrates the storing of parity data at a buffer memory and the storing of data from a stream of data at a storage system in accordance with some embodiments of the present disclosure.

FIG. 3 illustrates the storing of parity data at a buffer memory and the storing of data from a stream of data at a storage system 300. In general, the storage system 300 may correspond to the storage system 110 of FIG. 1.

As shown in FIG. 3, the storage system 300 may include one or more memory devices 330, a buffer memory 310, and an XOR calculator 320. In some embodiments, the buffer memory 310 and the XOR calculator may be components of a controller of the storage system 300. A stream of data 301 may be received by the storage system 300. For example, data from a series of write requests may be received to be stored at the memory devices 330. As the data from the stream of data 301 is received and stored at the memory devices 330, a parity data value may be calculated for the stream of data 301. For example, a first data block of the stream of data 301 may be received and stored as data block '0' at the memory devices 330. The first data block may also be received by the XOR calculator 320 and stored at the buffer memory 310. Subsequently, a second data block of the stream of data 301 may be received and stored as data block '1' at the memory devices 330. Furthermore, the XOR calculator 320 may receive the second data block, retrieve the first data block stored at the buffer memory 310, and generate an intermediate parity data value based on a combination of the first data block and the second data block (e.g., an XOR combination) and may store the intermediate parity data value at the buffer memory 310. Similarly, a third data block from the stream of data 301 may be received and stored as data block '2' at the memory devices 330. Furthermore, the XOR calculator 320 may receive the third data block, retrieve the intermediate parity data value from the buffer memory 310, and generate parity data 321 based on a combination of the intermediate parity data value and the third data block. The parity data 321 may be stored at the memory devices 330. In some embodiments, the parity data 321 may be stored at the memory devices 330 when a threshold number of data blocks or user data elements have been received and stored at the memory devices 330. After the threshold number of data blocks are stored, then the parity data 321 that is based on a combination of the stored data blocks may be stored with the data blocks. For example, the data blocks and the parity data may be stored as a stripe 331 where each data block and the parity data are stored in different memory devices or different locations or die of memory devices. Thus, the buffer memory 310 may store values that are used to generate parity data for a particular stripe of a particular stream of data. After the parity data 321 is stored at the memory devices 330, a new parity data value may be generated for a new stripe of the stream (e.g., based on combinations of a subsequent three data blocks).

In the event of a failure of one of the memory devices 330 or a particular die of one of the memory devices 330, one of the data blocks from the stripe 331 may be lost if the data block is stored at the failed memory device or failed die. In response to such a failure, the remaining data blocks and the parity data from the stripe 331 may be retrieved and an XOR operation may be performed between the remaining data blocks and the parity data to generate the lost data block from the stripe 331. The newly generated data block may then be subsequently stored at another memory device or another die of a memory device.

Although FIG. 3 illustrates a stripe of a stream of data as including three data blocks and one parity data, any number of data blocks may be included in a stripe with a parity data.

Figure 4:
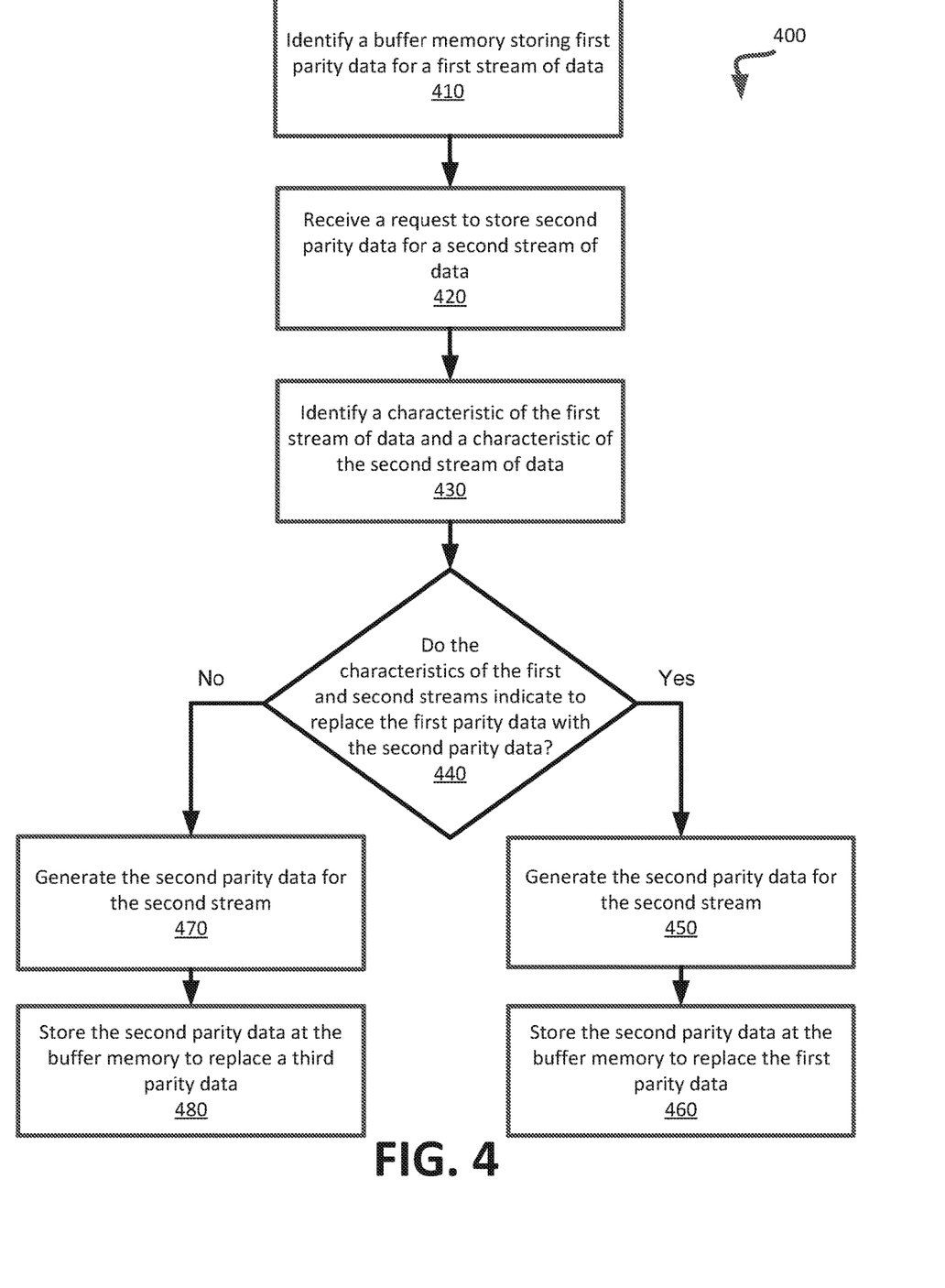
FIG. 4 is a flow diagram of an example method to assign streams of data to a buffer memory for storing parity data in accordance with some embodiments of the present disclosure

FIG. 4 is a flow diagram of an example method 400 to assign streams of data to a buffer memory for storing parity data. The method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the parity data component 113 of the controller 111 of FIG. 1.

As shown in FIG. 4, the method 400 may begin, at block 410, with the processing logic identifying a buffer memory that is storing first parity data for a first stream of data (block 410). The first parity data may be based on data from the first stream of data. For example, the buffer memory may be storing and updating values to generate a parity data for a stripe of the first stream of data. The first stream of data may be a particular stream from multiple streams of data that each currently has a parity data stored at the buffer memory (e.g., active streams of data). The processing logic may further receive a request to store second parity data for a second stream of data (block 420). The second parity data may be based on data from the second stream of data. The second stream of data may be a stream from another group of streams of data that are managed by a controller but in which each stream currently does not have a parity data stored at the buffer memory (e.g., non-active streams of data). In some embodiments, the request to store the second parity data may be received after the buffer memory is storing the first parity data for the first stream of data. The processing logic may subsequently identify a characteristic of the first stream of data and a characteristic of the second stream of data (block 430). The characteristics from the first and second streams may be indicative a frequency of data for the respective stream being received, a data availability for the respective stream, a type of programming pass associated with the respective stream, and a scheduling associated with streams as described in further detail with respect to FIG. 5. In some embodiments, the characteristic of a stream may be indicative of how often data from the stream may be stored at the storage system or indicative of a utilization of the storage system (e.g., a number of the memory devices of the storage system that will be actively writing data at a particular point in time).

The processing logic may determine whether the characteristic of the first stream and the characteristic of the second stream indicate to replace the first parity data with the second parity data (block 440). For example, the characteristics may indicate to replace the first parity data when the second characteristic of the second stream is indicative of data from the second stream being more frequently stored at the storage system or utilizing the storage system more frequently than the first stream. In response to determining that the characteristics indicate to replace the first parity data with the second parity data, the second parity data for the second stream may be generated (block 450). For example, the second parity data may be calculated for a stripe of the second stream. Subsequently, the processing logic may store the second parity data at the buffer memory to replace the first parity data (block 460). For example, a portion of the buffer memory that was previously storing the first parity data may be overwritten with the second parity data. In some embodiments, the first parity data may be stored in another buffer (e.g., a volatile DRAM memory) and may be restored to the buffer memory after a subsequent indication to generate the first parity data for the first stream at a later time. In the same or alternative embodiments, the first parity data may be overwritten after the data from the first stream is written to a boundary of a memory page. For example, the data from the first stream may be stored at the memory devices of the storage system so that a last write request before the first parity data is overwritten utilizes an entire memory page as opposed to a portion of the memory page.

Otherwise, in response to determining that the characteristics do not indicate to replace the first parity data with the second parity data, then the second parity data may be generated for the second stream (block 470) and stored at the buffer memory to replace a third parity data (block 480). For example, the parity data that is being generated for a third stream may be removed from the memory device and replaced with the first parity data. In some embodiments, the characteristics of the second stream and the third stream may indicate that the data from the second stream will be more frequently stored at the storage system or will utilize the storage system more frequently than the third stream.

Figure 5:
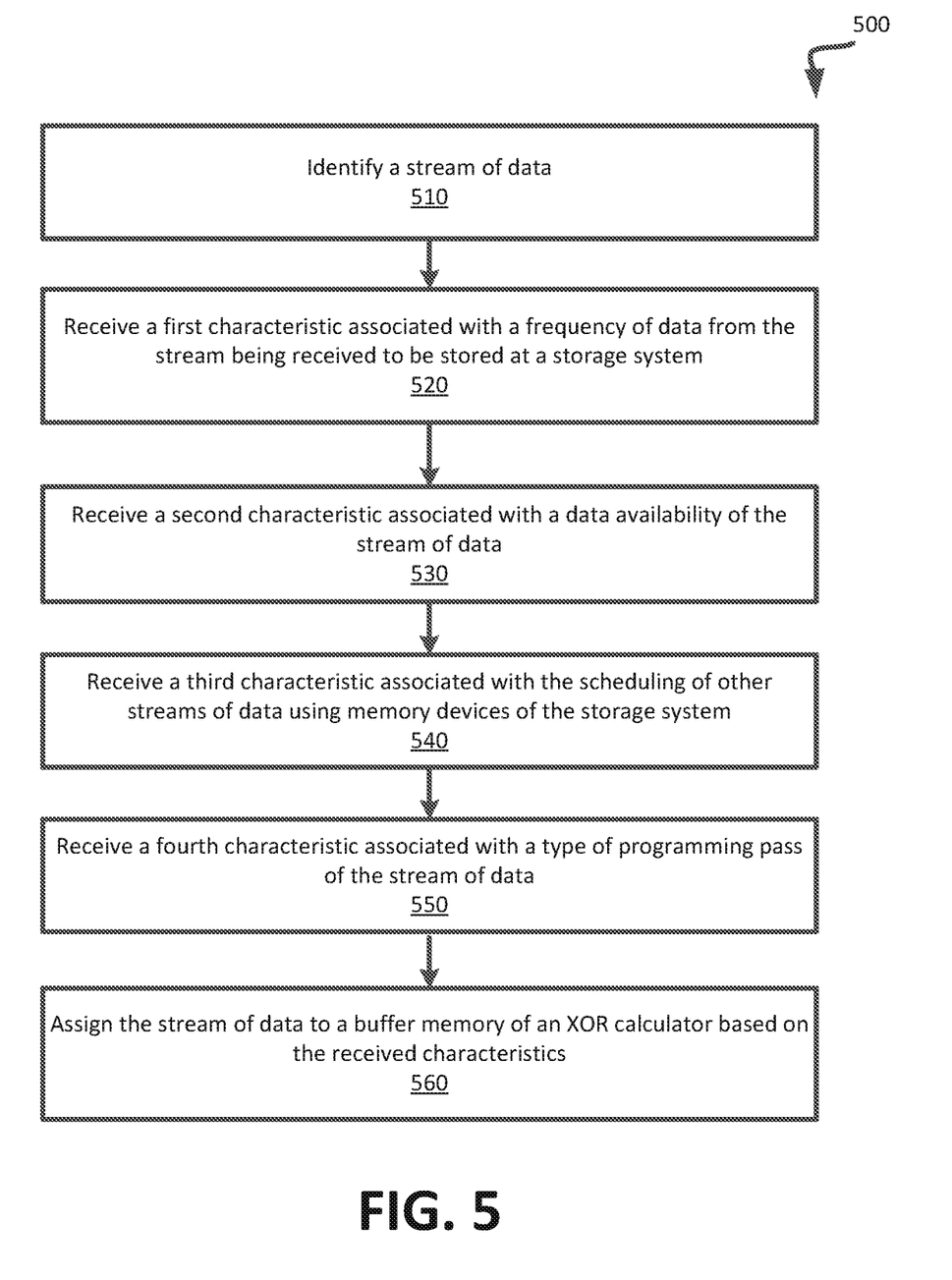
FIG. 5 is a flow diagram of an example method to assign a stream of data to a buffer memory based on characteristics associated with the stream of data in accordance with some embodiments of the present disclosure.

FIG. 5 is a flow diagram of an example method 500 to assign a stream of data to a buffer memory based on characteristics associated with the stream of data. The method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the parity data component 113 of the controller 111 of FIG. 1.

As shown in FIG. 5, the method 500 may begin, at block 510, with the processing logic identifying a stream of data. The processing logic may further receive a first characteristic associated with a frequency of data from the stream of data being received to be stored at a storage system (block 520). For example, the first characteristic may identify how often data from the identified stream of data from a host system is received to be stored at a memory device of the storage system (e.g., how often a write request from the first stream of data is received). The processing logic may further receive a second characteristic associated with a data availability of the stream of data (block 530). In some embodiments, write requests from the host system may be stored in a volatile storage (e.g., a DRAM) of the storage system until data from the write requests are stored within the memory devices of the storage system. The second characteristic may identify an amount of the data (e.g., a number of data blocks from a number of write requests) that is currently stored at the volatile storage and that has not yet been stored at the memory devices (e.g., the non-volatile storage).

The processing logic may further receive a third characteristic associated with the scheduling of other streams of data using the memory devices of the storage system (block 540). In some embodiments, a memory device or a portion (e.g., a die) of the memory device may perform operations to store data for a single write request at a time. As such, a portion of a memory device may store data from a single write request of a single stream at a particular time. The third characteristic may thus identify the portions of the memory devices that are being utilized to store data from streams for which parity data is currently being generated and stored. In some embodiments, the third characteristic may further identify when a particular portion of the memory device is expected to be utilized by a particular stream. Thus, the third characteristic may correspond to a schedule that identifies when each of the streams is expected to utilize particular portions of particular memory devices of the storage system.

Referring to FIG. 5, the processing logic may further receive a fourth characteristic associated with a type of programming pass of the stream of data (block 550). In some embodiments, a portion (e.g., a memory cell) of a memory device may store multiple bits (e.g., memory pages). For example, a memory cell may store a first bit corresponding to a lower page and a second bit corresponding to an upper page. For example, two bits or memory pages '10' may be programmed by having a first programming pass for the lower page having the memory cell at a value of '0' and a second programming pass for the upper page having the memory cell at the value of '1.' Thus, different bits of the memory cell may be programmed by different programming passes. Although two-pass programming is described, aspects of the present disclosure may relate to memory devices with any number of programming passes to program any number of bits of a memory cell at the memory device. In some embodiments, each programming pass may utilize a separate portion of the buffer memory that is storing parity data for a particular stream. For example, a single pass programming may utilize half as much storage of the buffer memory when compared with a two-pass programming. For example, a single pass programming operation may result in one data block of the memory buffer being used to generate parity data while a two-pass programming operation may result in two data blocks of the memory buffer being used to generate parity data. Thus, a stream of data that is associated with a single pass programming may use less of the buffer memory than another stream of data that is associated with two-pass programming.

The processing logic may further assign the stream of data to a buffer memory of an XOR calculator based on the received characteristics (block 560). For example, a decision may be made to assign the stream of data to the buffer memory based one of the characteristics or a combination of the characteristics. The parity data for another stream that is currently assigned to the buffer memory may be replaced with parity data for the identified stream.

In some embodiments, a combination of the characteristics may indicate a frequency of data being stored at the storage system or a utilization of the storage system. For example, a first stream may be assigned to the buffer memory to replace the parity data of a second stream when the assigning of the first stream to the buffer memory results in a higher frequency of data being stored at the storage system or an increased utilization of the storage system. In some embodiments, assigning the first stream to the buffer memory to replace the parity data of the second stream may result in the higher frequency of data being stored or increased utilization when the frequency of data of the first stream being received is higher than the frequency of data of the second stream being received and/or when the data availability of the first stream is more than the data availability of the second stream. Additionally, the first stream may be assigned to the buffer memory to replace another stream that is associated with the same type of programming pass. The first stream may replace another stream that is performing the same number of programming passes as the first stream. For example, if the second stream is performed a two-pass programming that uses two blocks of the buffer memory, then the first stream may be used to replace the second stream if the first stream is also performing a two-pass programming as both of the blocks of the buffer memory may be switched from the second stream to the first stream. However, if the first stream was using a single pass programming, then one of the two blocks of the buffer memory may not be utilized as a single block of the buffer memory may be used during single pass programming. Furthermore, the first stream may be assigned to the buffer memory based on the scheduling of other streams of data. For example, the first stream may be assigned to the buffer memory based on when other streams of data are expected to utilize memory devices. In some embodiments, if the second stream and a third stream that are currently assigned to the memory buffer are expected to utilize the same memory devices for a period of time, then the parity data for one of the second stream or the third stream may be replaced with the parity data for the first stream if the first stream is expected to utilize a different memory device for the period of time.

Figure 6A:
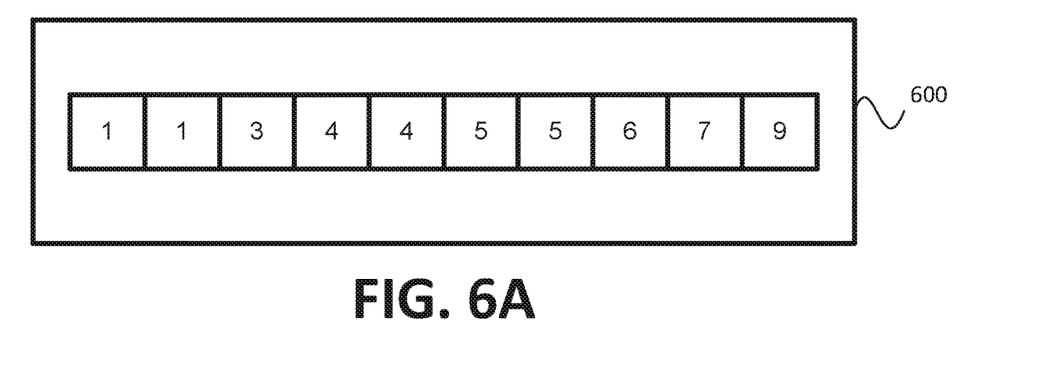
FIG. 6A illustrates streams of data that have been assigned to a buffer memory in accordance with some embodiments.

FIG. 6A illustrates an example buffer memory 600 of an XOR calculator. In general, streams of data may be assigned to the buffer memory 600 by the parity data component 113 of the controller 111 of FIG. 1.

As shown in FIG. 6A, the buffer memory 600 may include parity data for multiple streams. The buffer memory 600 may include a number of slots or blocks that may be used to store parity data for a particular stream. For example, ten streams may be managed by a controller and the buffer memory 600 may store parity data for a subset of the ten streams. As shown, the buffer memory 600 may store parity data for streams 1, 3, 4, 5, 6, 7, and 9 where two blocks are used to store parity data for stream 1, stream 4, and stream 5 (e.g., the streams 1, 4, and 5 are using a two-pass programming that uses one of a pair of blocks for the lower page and another block for the upper page) while single blocks of the buffer memory 600 are used to store parity data for each of the streams 3, 6, 7, and 9. Other streams may not be currently assigned to the buffer memory 600.

Figure 6B:
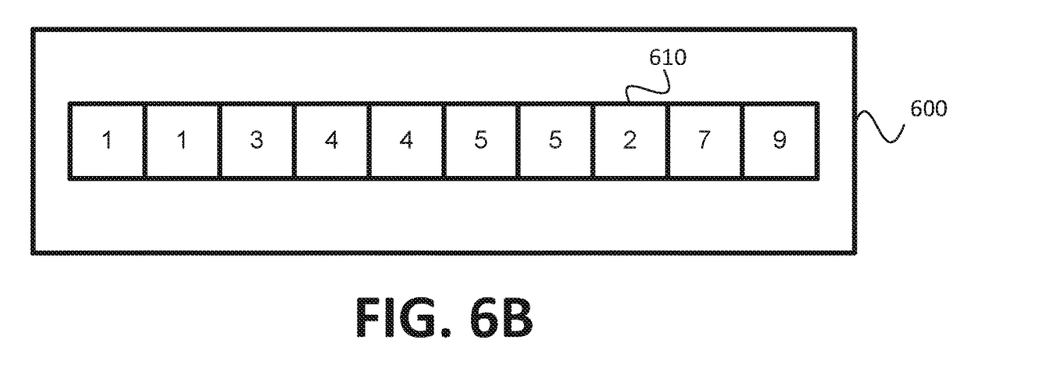
FIG. 6B illustrates a new stream that has been assigned to the buffer memory in accordance with some embodiments of the present disclosure.

FIG. 6B illustrates the buffer memory 600 with a newly assigned stream. For example, the stream 2 may be assigned to the buffer memory 600 at the block 610 that was previously assigned to the stream 6. As such, the parity data for the stream 6 may no longer be stored in the block 610 of the buffer memory 600 after the parity data for the stream 2 is generated and stored at the block 610.

Figure 6C:
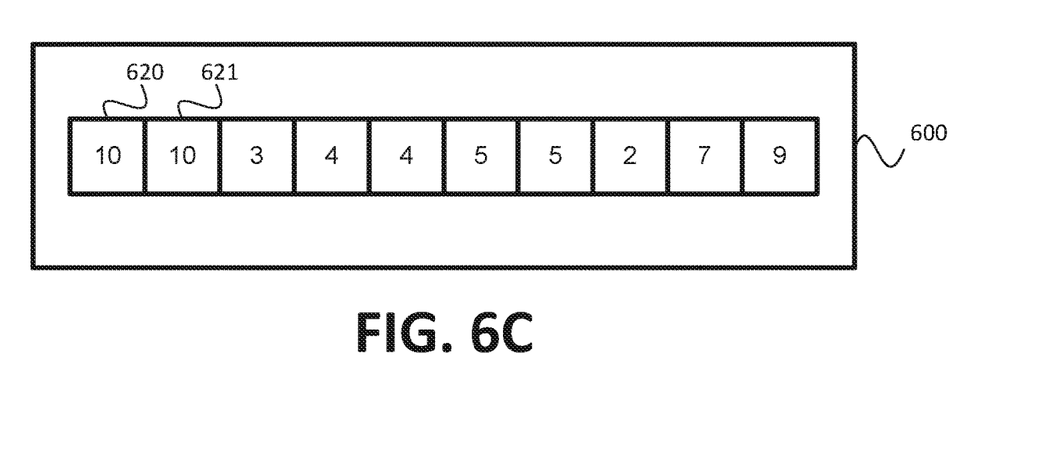
FIG. 6C illustrates another new stream that has been assigned to the buffer memory in accordance with some embodiments.

Furthermore, FIG. 6C illustrates the buffer memory 600 with another newly assigned stream. As shown, the stream 10 may be assigned to the blocks 620 and 621 of the buffer memory 600. As such, the stream 10 may be associated with two-pass programming and may replace another stream that was associated with two-pass programming.

Figure 7:
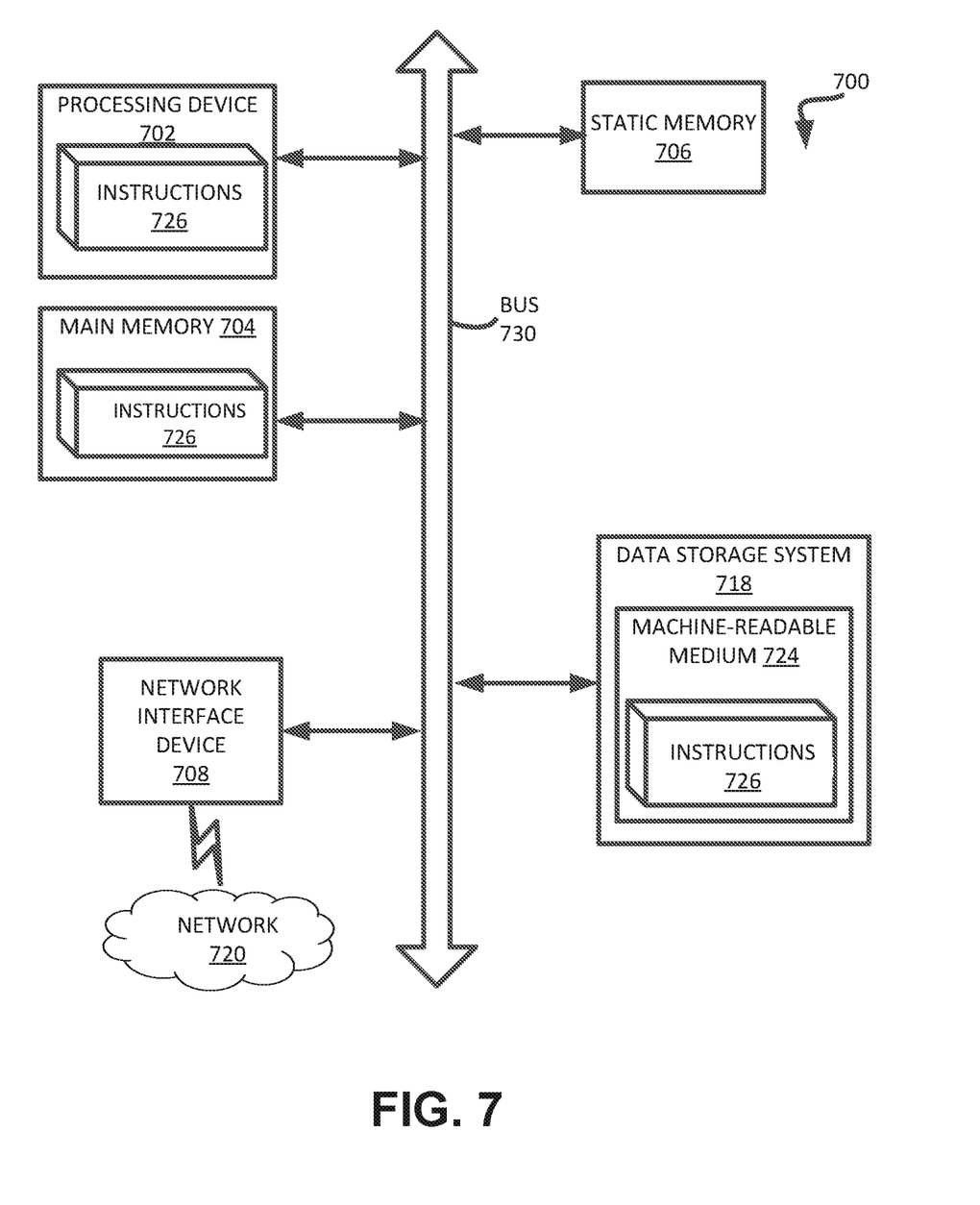
FIG. 7 is a block diagram of an example computer system in which implementations of the present disclosure may operate.

FIG. 7 illustrates an example machine of a computer system 700 within which a set of instructions, for causing the machine to perform any one or more of the methodologies discussed herein, may be executed. For example, the computer system 700 may correspond to a host system (e.g., the host system 120 of FIG. 1) that includes or utilizes a storage system (e.g., the storage system 110 of FIG. 1) or may be used to perform the operations of a controller (e.g., to execute an operating system to perform operations corresponding to the parity data component 113 of FIG. 1). In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730. Processing device 702 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 may further include a network interface device 708 to communicate over the network 720.

The data storage system 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 may correspond to the storage system 110 of FIG. 1.

In one implementation, the instructions 726 include instructions to implement functionality corresponding to a parity data component (e.g., parity data component 113 of FIG. 1). While the machine-readable storage medium 724 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure may refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus may be specially constructed for the intended purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A system comprising:
a buffer memory storing first parity data for a first stream of data associated with data that is stored at a storage system; and
a processing device, operatively coupled with the buffer memory, to:
receive a request to store second parity data for a second stream of data associated with the data that is to be stored at the storage system;
identify a characteristic of the first stream of data;
determine whether to replace the first parity data for the first stream with the second parity data for the second stream based on a comparison of the characteristic of the first stream of data to a characteristic of the second stream of data associated with the data that is to be stored at the storage system;
in response to determining to replace the first parity data with the second parity data based on the characteristic of the first stream of data, generate the second parity data for the second stream of data; and
store the second parity data at the buffer memory to replace the first parity data.

2. The system of claim 1, further comprising:
an exclusive-or (XOR) calculator to generate the first parity data and the second parity data, the first parity data being generated based on data from the first stream of data that is stored at the storage system and the second parity data being generated based on data from the second stream of data.

3. The system of claim 1, wherein the first stream of data corresponds to a group of write requests sharing a first characteristic, and the second stream of data corresponds to a second group of write requests sharing a second characteristic that is different than the first characteristic.

4. The system of claim 1, wherein the characteristic of the first stream of data is a frequency of data from the first stream of data being received to be stored at the storage system, and wherein to determine whether to replace the first parity data for the first stream with the second parity data for the second stream based on the characteristic of the first stream of data, the processing device is further to:
determine to replace the first parity data with the second parity data when the frequency of data from the first stream being received is lower than a frequency of data from the second stream being received.

5. The system of claim 1, wherein the characteristic of the first stream of data is an amount of data from the first stream of data that is available to be stored at a non-volatile memory of the storage system, and wherein to determine whether to replace the first parity data for the first stream with the second parity data for the second stream based on the characteristic of the first stream of data, the processing device is further to:
determine to replace the first parity data with the second parity data when the amount of data from the first stream that is available to be stored at the non-volatile memory of the storage system is less than an amount of data from the second stream that is available to be stored at the non-volatile memory of the storage system.

6. The system of claim 1, wherein the characteristic of the first stream of data is a scheduling of non-volatile memory devices of the storage system, the scheduling identifying when the first stream of data is to utilize the non-volatile memory devices.

7. The system of claim 1, wherein the characteristic of the first stream is a type of programming pass of the first stream of data, and wherein to determine whether to replace the first parity data for the first stream with the second parity data for the second stream based on the characteristic of the first stream of data, the processing device is further to:
determine to replace the first parity data with the second parity data when the second stream utilizes the same type of programming pass as the first stream of data.

8. The system of claim 1, wherein the storage system is associated with a plurality of streams of data, and the buffer memory stores a parity data for each stream from a subset of the plurality of streams of data.

9. A method comprising:
identifying a buffer memory storing first parity data for a first stream of data associated with data that is stored at a storage system;

receiving a request to store second parity data for a second stream of data associated with the data that is to be stored at the storage system;

identifying a characteristic of the first stream of data;

determining, by a processing device, whether to replace the first parity data for the first stream with the second parity data for the second stream based on a comparison of the characteristic of the first stream of data to a characteristic of the second stream of data associated with the data that is to be stored at the storage system;

in response to determining to replace the first parity data with the second parity data based on the characteristic of the first stream of data, generating the second parity data for the second stream of data; and storing the second parity data at the buffer memory to replace the first parity data.

10. The method of claim 9, further comprising:

generating the first parity data and the second parity data, the first parity data being generated based on an exclusive-or (XOR) operation between data from the first stream of data that is stored at the storage system and the second parity data being generated based on the XOR operation between data from the second stream of data.

11. The method of claim 9, wherein the first stream of data corresponds to a group of write requests sharing a first characteristic, and the second stream of data corresponds to a second group of write requests sharing a second characteristic that is different than the first characteristic.

12. The method of claim 9, wherein the characteristic of the first stream of data is a frequency of data from the first stream of data being received to be stored at the storage system, and wherein to determine whether to replace the first parity data for the first stream with the second parity data for the second stream based on the characteristic of the first stream of data, the method further comprises:

determining to replace the first parity data with the second parity data when the frequency of data from the first stream being received is lower than a frequency of data from the second stream being received.

13. The method of claim 9, wherein the characteristic of the first stream of data is an amount of data from the first stream of data that is available to be stored at a non-volatile memory of the storage system, and wherein to determine whether to replace the first parity data for the first stream with the second parity data for the second stream based on the characteristic of the first stream of data, the method further comprises:

determining to replace the first parity data with the second parity data when the amount of data from the first stream that is available to be stored at the non-volatile memory of the storage system is less than an amount of data from the second stream that is available to be stored at the non-volatile memory of the storage system.

14. The method of claim 9, wherein the characteristic of the first stream of data is a scheduling of non-volatile memory devices of the storage system, the scheduling identifying when the first stream of data is to utilize the non-volatile memory devices.

15. The method of claim 9, wherein the characteristic of the first stream is a type of programming pass of the first stream of data, and wherein to determine whether to replace the first parity data for the first stream with the second parity data for the second stream based on the characteristic of the first stream of data, the method further comprises:

determining to replace the first parity data with the second parity data when the second stream utilizes the same type of programming pass as the first stream of data.

16. The method of claim 9, wherein the storage system is associated with a plurality of streams of data, and the buffer memory stores a parity data for each stream from a subset of the plurality of streams of data.

17. A system comprising:

a memory; and a controller, operatively coupled with the memory, to:

identify a first stream of data, wherein an exclusive-or (XOR) calculator component is generating first parity data for data from the first stream of data that is stored at a storage system;

receive a request to store data from a second stream of data at the storage system;

identify a characteristic of the first stream of data;

determine to switch the XOR calculator component from generating the first parity data for the data from the first stream to generating second parity data for the data from the second stream based on a comparison of the characteristic of the first stream of data to a characteristic of the second stream of data associated with the data that is to be stored at the storage system; and generate the second parity data for the data of the second stream of data in response to the determination.

18. The system of claim 17, wherein to generate the second parity data for the data of the second stream of data in response to the determination, the controller is further to:

halt the generating of the first parity data by the XOR calculator component, wherein the generating of the second parity data is further in response to halting the generating of the first parity data.

19. The system of claim 17, wherein the first stream of data corresponds to a group of write requests sharing a first characteristic, and the second stream of data corresponds to a second group of write requests sharing a second characteristic that is different than the first characteristic.

20. The system of claim 19, wherein the first characteristic is associated with a first period of time before the data of the first stream is erased, and wherein the second characteristic is associated with a second period of time before the data of the second stream is erased.

21. The system of claim 17, wherein the characteristic of the first stream of data is a frequency of data from the first stream of data being received to be stored at the storage system, and wherein determining to switch the XOR calculator component from generating the first parity data to generating the second parity data is further based on the frequency of data received from the first stream being lower than a frequency of data received from the second stream.

22. The system of claim 17, wherein the characteristic of the first stream of data is an amount of data from the first stream of data that is available to be stored at a non-volatile memory of the storage system, and wherein determining to switch the XOR calculator component from generating the first parity data to generating the second parity data is further based on the amount of data from the first stream that is available to be stored at the non-volatile memory of the storage system being less than an amount of data from the second stream that is available to be stored at the non-volatile memory of the storage system.

23. The system of claim 17, wherein the characteristic of the first stream of data is an amount of data from the first stream of data that is available to be stored at a non-volatile memory of the storage system, and wherein determining to switch the XOR calculator component from generating the first parity data to generating the second parity data is further based on the amount of data from the first stream that is available to be stored at the non-volatile memory of the storage system being less than an amount of data from the second stream that is available to be stored at the non-volatile memory of the storage system.

24. The system of claim 17, wherein the characteristic of the first stream of data is a scheduling of non-volatile memory devices of the storage system, the scheduling identifying when the first stream of data is to utilize the non-volatile memory devices.

25. The system of claim 17, wherein the characteristic of the first stream is a number of programming passes performed by the first stream of data, and wherein determining to switch the XOR calculator component from generating the first parity data to generating the second parity data is further based on the second stream utilizing the same number of programming passes as the first stream of data.

26. A method comprising:
    identifying a first stream of data that is associated with an exclusive-or (XOR) calculator component generating first parity data for data from the first stream of data that is stored at a storage system;
    receiving a request to store data from a second stream of data at the storage system;
    identifying a characteristic of the first stream of data;
    determining, by a processing device, to switch the XOR calculator component from generating the first parity data for the data from the first stream to generating second parity data for the data from the second stream based on a comparison of the characteristic of the first stream of data to a characteristic of the second stream of data associated with the data that is to be stored at the storage system; and
    generating the second parity data for the data of the second stream of data in response to the determination.

27. The method of claim 26, wherein to generate the second parity data for the data of the second stream of data in response to the determination, the method further comprising:
    halting the generating of the first parity data by the XOR calculator, wherein the generating of the second parity data is further in response to halting the generating of the first parity data.

28. The method of claim 26, wherein the first stream of data corresponds to a group of write requests sharing a first characteristic, and the second stream of data corresponds to a second group of write requests sharing a second characteristic that is different than the first characteristic.

29. The method of claim 28, wherein the first characteristic is associated with a first period of time before the data of the first stream is erased, and wherein the second characteristic is associated with a second period of time before the data of the second stream is erased.

30. The method of claim 26, wherein the characteristic of the first stream of data is a frequency of data from the first stream of data being received to be stored at the storage system, and wherein determining to switch the XOR calculator component from generating the first parity data to generating the second parity data is further based on the frequency of data received from the first stream being lower than a frequency of data received from the second stream.

31. The method of claim 26, wherein the characteristic of the first stream of data is an amount of data from the first stream of data that is available to be stored at a non-volatile memory of the storage system, and wherein determining to switch the XOR calculator component from generating the first parity data to generating the second parity data is further based on the amount of data from the first stream that is available to be stored at the non-volatile memory of the storage system being less than an amount of data from the second stream that is available to be stored at the non-volatile memory of the storage system.

32. The method of claim 26, wherein the characteristic of the first stream of data is an amount of data from the first stream of data that is available to be stored at a non-volatile memory of the storage system, and wherein determining to switch the XOR calculator component from generating the first parity data to generating the second parity data is further based on the amount of data from the first stream that is available to be stored at the non-volatile memory of the storage system being less than an amount of data from the second stream that is available to be stored at the non-volatile memory of the storage system.

33. The method of claim 26, wherein the characteristic of the first stream of data is a scheduling of non-volatile memory devices of the storage system, the scheduling identifying when the first stream of data is to utilize the non-volatile memory devices.

34. The method of claim 26, wherein the characteristic of the first stream is a number of programming passes performed by the first stream of data, and wherein determining to switch the XOR calculator component from generating the first parity data to generating the second parity data is further based on the second stream utilizing the same number of programming passes as the first stream of data.

35. A system comprising:
    a memory; and
    a processing device, operatively coupled with the memory, to:
        identify a buffer memory storing first parity data for a first stream of data associated with a storage system;
        receive a request to store second parity data for a second stream of data associated with the storage system;
        determine, based on a comparison of a characteristic of the first stream of data to a characteristic of the second stream of data, whether replacing the first parity data for the first stream of data with the second parity data for the second stream of data corresponds to an increase of utilization of the storage system;
        in response to determining that replacing the first parity data with the second parity corresponds to the increase of utilization of the storage system, generate the second parity data for the second stream of data; and
        replace the first parity data at the buffer memory with the second parity data.

* * * * *